United States Patent
Matthae et al.

(10) Patent No.: US 6,504,653 B2
(45) Date of Patent: Jan. 7, 2003

(54) HIGH APERTURE OBJECTIVE LENS

(75) Inventors: Manfred Matthae; Lothar Schreiber, both of Jena; Andreas Faulstich, Goettingen; Werner Kleinschmidt, Adelebsen, all of (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 09/930,858

(22) Filed: Aug. 15, 2001

(65) Prior Publication Data

US 2002/0154414 A1 Oct. 24, 2002

(30) Foreign Application Priority Data

Feb. 21, 2001 (DE) .......................... 101 08 796

(51) Int. Cl.⁷ .............................................. G02B 21/02
(52) U.S. Cl. ...................................................... 359/656
(58) Field of Search ................................. 359/656–661

(56) References Cited

U.S. PATENT DOCUMENTS

| 4,232,940 A | 11/1980 | Nakagawa | 359/658 |
| 5,530,590 A | 6/1996 | Saito | 359/658 |
| 5,739,958 A | * 4/1998 | Abe | 359/660 |
| 5,805,346 A | * 9/1998 | Tomimatsu | 359/656 |
| 5,982,559 A | 11/1999 | Furutake | 359/656 |
| 6,128,128 A | * 10/2000 | Otaki et al. | 359/381 |

FOREIGN PATENT DOCUMENTS

DE  28 28 173 C2  3/1983

OTHER PUBLICATIONS

*English Abstract of DE 28 28 173 C2.

* cited by examiner

Primary Examiner—Jordan M. Schwartz
Assistant Examiner—William Choi
(74) Attorney, Agent, or Firm—Reed Smith LLP

(57) ABSTRACT

A high-aperture objective comprising a first lens L1 with positive refractive power f1 and a second lens L2 with negative refractive power f2, wherein the focal length ratio between the two lenses is in the range of $-0.4 < (f1/f2) < -0.1$ and the total refractive power $1/f1 + 1/f2$ is greater than zero, two positive lenses L3, L4 whose ratio diameter d3, d4 to focal length f3, f4 satisfies the condition greater than 0.3 and less than 0.6: $0.3 < d3/f3 < 0.6$, $0.3 < d4/f4 < 0.6$, a negative lens L5 and a collective lens L6, wherein the negative lens faces the front group and the focal length ratio of L5 and L6 f5/f6 is between $-0.5$ and $-2$: $-0.5 < f5/f6 < -2$.

3 Claims, 3 Drawing Sheets

HIGH APERTURE OBJECTIVE LENS

CROSS-REFERENCE TO RELATED APPLICATIONS

This application claims priority of German Application No. 101 08 796.9, filed Feb. 21, 2001, the complete disclosure of which is hereby incorporated by reference.

BACKGROUND OF THE INVENTION

The aperture is an essential criterion for characterizing the performance of microscope objectives. It is the product of the sine of half the acceptance angle and the refractive index of the immersion liquid in immersion applications. The acceptance angle is significant particularly in TIRF (Total Internal Reflection Fluorescence) applications, where total reflection is used to observe fluorescence in an interface or boundary layer. In fluorescence excitation by total reflection (TIRF), the objective is used in an aqueous specimen medium. Collimated light is coupled in at one point in the pupil of the objective which corresponds to an aperture of >1.38. This aperture exceeds the critical angle of total reflection of the coverslip/water transition, i.e., the incident light is reflected at the boundary surface by total reflection; as a result, there occurs directly above the boundary layer an evanescent light wave, as it is called, whose penetration depth in water is only on the order of magnitude of the light wavelength. This enables depth-selective fluorescence excitation of objects in the immediate vicinity of the boundary layer.

Prior patent publications on microscope objectives with standard immersions do not substantially exceed apertures of more than 1.4. The higher-aperture systems (>1.4) described in the patent literature achieve this via the refractive index of the immersion liquid (n approximately 1.78) (U.S. Pat. No. 5,659,425). However, immersion liquids of the type mentioned above have considerable disadvantages, so that they are applied only seldom in practice (toxic, inhomogeneous, etc.). In addition, the refractive index of the coverslip material must also be adapted, which entails additional cost.

OBJECT AND SUMMARY OF THE INVENTION

It is the primary object of the invention to achieve an objective with a high aperture and simple construction.

The present invention achieves a surprisingly large acceptance angle in a simple construction, i.e., compared with other microscope objectives, the quotient of the numerical aperture and the index of refraction of the immersion oil (standard immersion oils approximately 1.5) is not exceeded.

With standard immersion oils (n[546 nm]=1.52), the aperture has a value in the axis of about 1.45 and still has a value of about 1.43 at the edge of field (2y'=20 mm). Substantial advantages such as better detail resolution and higher light intensity are achieved through the large aperture.

DESCRIPTION OF THE PREFERRED EMBODIMENTS

The high performance features mentioned above are achieved by means of an optical construction which is characterized as follows:

High-aperture objective, characterized by the condition A/n>0.938, where A is the aperture and n is the refractive index of the immersion medium at 546 nm.

Figure 1:
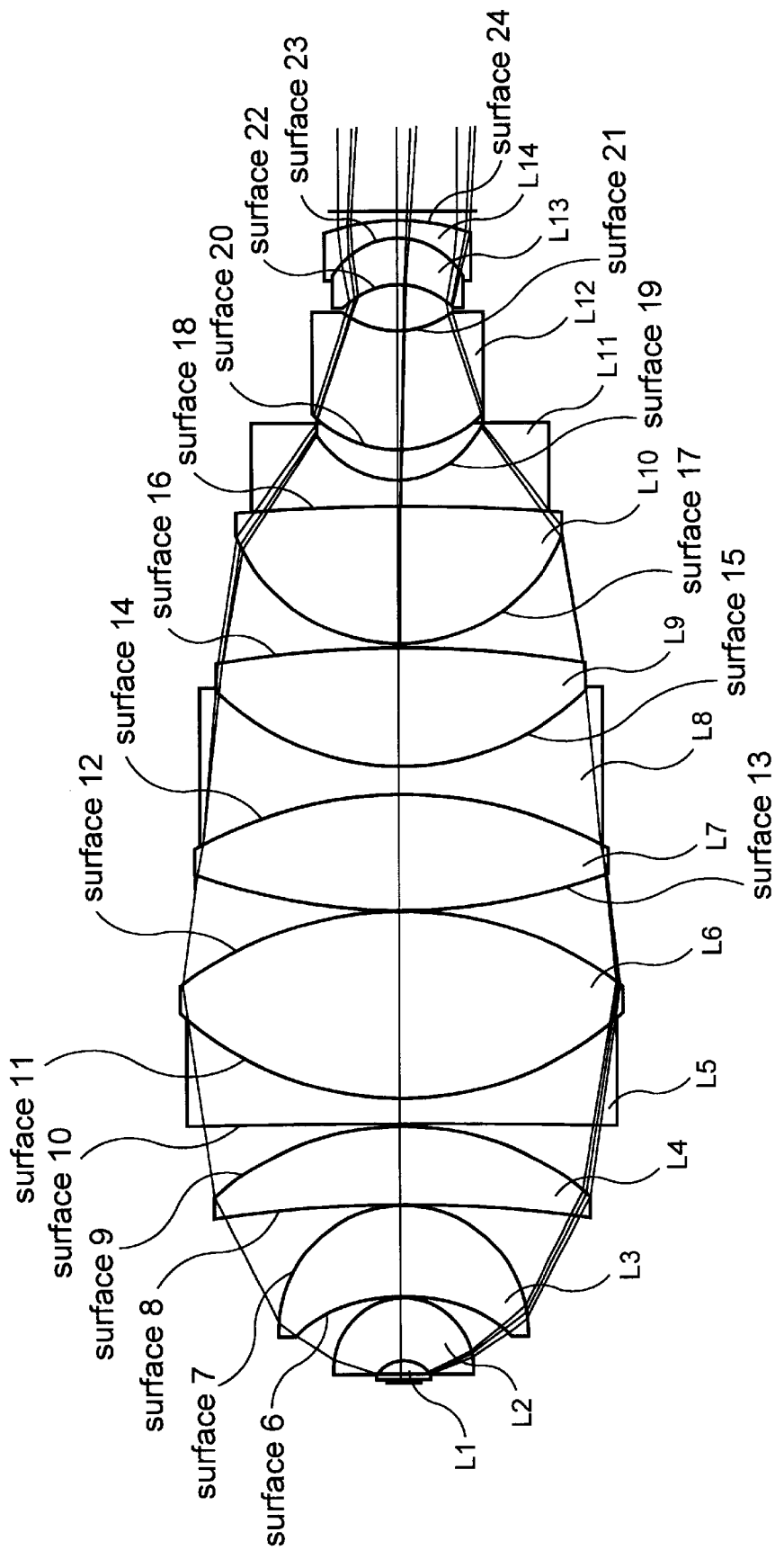
FIG. 1 illustrates an objective lens according to the invention.
Figure 2:
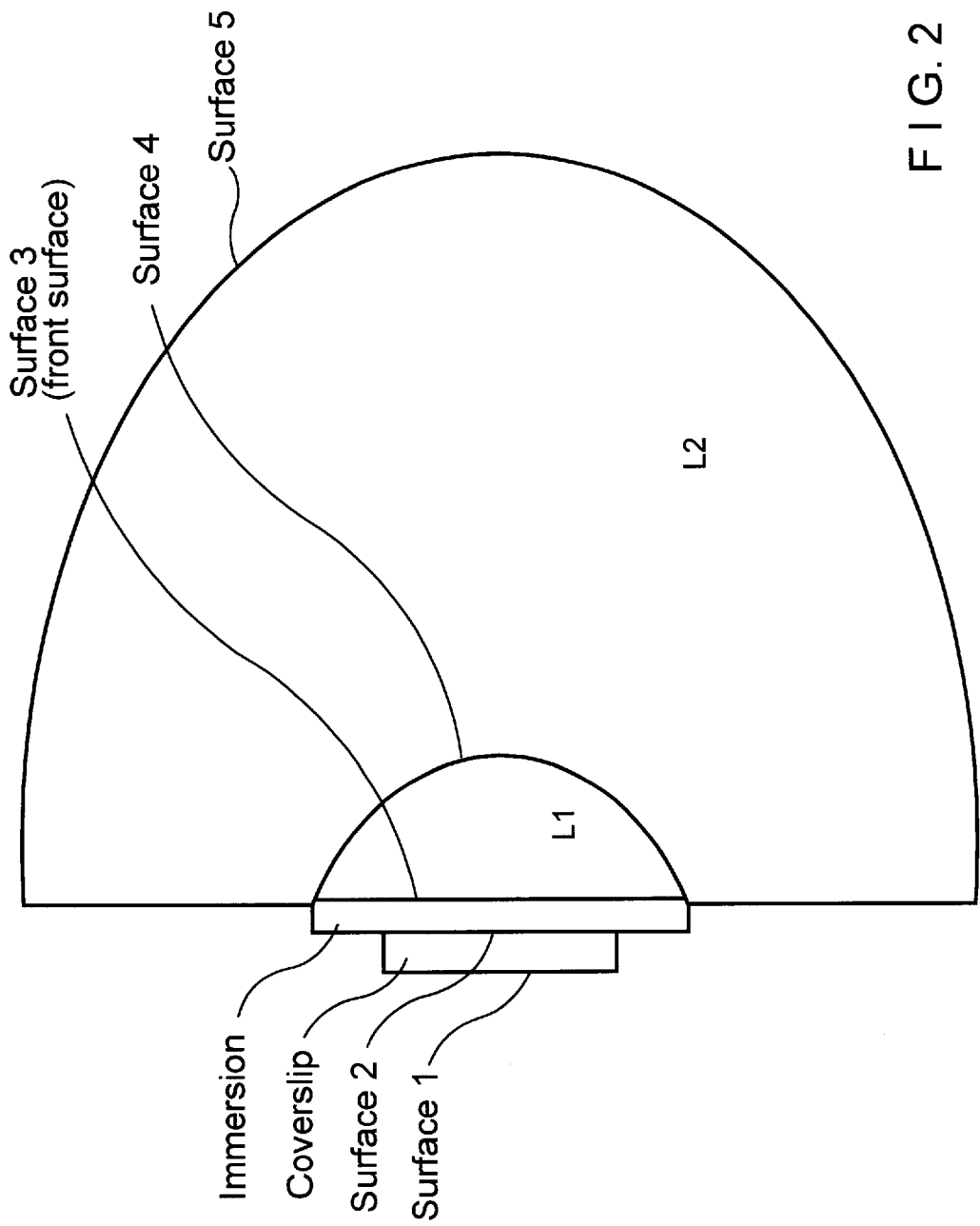
FIG. 2 illustrates the front lens group in an enlarged view.

An objective lens according to the invention is shown schematically in FIG. 1; the front lens groups (front group) is shown in an enlarged view in FIG. 2.

The front group comprises a lens L1 with a positive refractive power f1 and low refractive index (n[546 nm]<1.6) which is cemented and embedded in a lens with negative refractive power f2 and a high refractive index (n[546 nm]>1.7. The focal length ratio between the two lenses is in the range of −0.4<(focal length f1 "+" divided by the focal length f2 "−")<−0.1. The total refractive power of the group is positive.

In order to reduce the acceptance angle, the front group is followed by two collective lenses L3, L4 whose ratio of diameter d3, d4 to focal length f3, f4 satisfies the condition: greater than 0.3 and less than 0.6.

The following group comprises a negative lens L5 and a collective lens L6, wherein the negative lens faces the front group. The focal length ratio of the two lenses f5:f6 is between −0.5 and −2. The total refractive power of this group is positive.

The next group comprises three cemented lenses L7, L8, L9 with positive total refractive power and individual focal lengths f7>0, f8<0 and f9>0 which are followed by five additional partially cemented lenses L10, L11, L12, L13 and L14 which act predominantly to compensate for field errors. There is an air gap between L11 and L12 and between L12 and L13.

The example of data of a tube lens example described in the following can be substituted by other examples. It serves to compensate for residual errors (e.g., color differences) in the infinity-corrected objective. The user may combine other tube lenses with the objective described above provided their correction is not opposed contrary to the correction requirements of the described objective.

The described objective achieves excellent optical correction in the axis and up to the image field of 2y'=20 mm. The aperture is 1.45 with magnification of 100×.

There is achromatism between wavelengths C' and F', wherein the remaining secondary spectrum lies within the depth of field range. Distortion is minimal.

System Data of a Design Example

The proposed microscope objective was corrected with a coverslip having a thickness of 0.17 mm. The distance between the coverslip and the first lens surface is 0.12 mm.

| Surface | Radii | Distances | Medium |
| --- | --- | --- | --- |
| 1 | infinity | 0.17 | coverslip |
| 2 | infinity | 0.12 | immersion oil |
| 3 | infinity | 0.6 | N-BK7 |
| 4 | −1.2579 | 2.5 | N-LASF31 |
| 5 | −2.778 | 0.1 | air |
| 6 | −6.5423 | 3.64 | N-FK51 |
| 7 | −4.9407 | 0.1 | air |
| 8 | −44.666 | 3.09 | N-PK51 |
| 9 | −11.14 | 0.103 | air |
| 10 | −139.25 | 1.11 | N-KzFS4 |
| 11 | 12.23 | 7.76 | N-PK51 |
| 12 | −13.925 | 0.1 | air |
| 13 | 21.754 | 4.87 | calcium fluoride |
| 14 | −15.961 | 1.16 | N-KzFS4 |
| 15 | 9.8584 | 4.87 | N-PK51 |
| 16 | −51.958 | 0.205 | air |

-continued

| | | | |
|---|---|---|---|
| 17 | 6.7777 | 5.83 | N-PK51 |
| 18 | -93.056 | 1.1 | N-KzFS4 |
| 19 | 3.5485 | 1.306 | air |
| 20 | 4.5281 | 4.85 | N-PK51 |
| 21 | 3.759 | 1.907 | air |
| 22 | -3.1612 | 1.92 | SF2 |
| 23 | -2.8175 | 0.73 | N-FK51 |
| 24 | -8.1748 | 96.419 | air |
| | | with tube lens | |
| 25 | 147.49 | 6 | BaF3 |
| 26 | -273.84 | 1.93 | air |
| 27 | infinity | 161.2 | BK7 |
| 28 | infinity | 54 | air |

Diameter:

| Surface | Clear diameter |
|---|---|
| 1 | 0.2 |
| 2 | 1.35 |
| 3 | 2 |
| 4 | 2.16 |
| 5 | 5.54 |
| 6 | 8.69 |
| 7 | 9.88 |
| 8 | 14.30 |
| 9 | 14.90 |
| 10 | 15.84 |
| 11 | 17.06 |
| 12 | 17.54 |
| 13 | 16.50 |
| 14 | 16.07 |
| 15 | 14.73 |
| 16 | 14.63 |
| 17 | 13.00 |
| 18 | 11.83 |
| 19 | 6.74 |
| 20 | 6.85 |
| 21 | 4.51 |
| 22 | 4.47 |
| 23 | 5.20 |
| 24 | 5.83 |

Tolerances:

Radial tolerances (passes) <4 Newton rings
Deviations in thickness and distances <0.06 mm
Maximum refractive index deviations +/-0.0005

Figure 3:
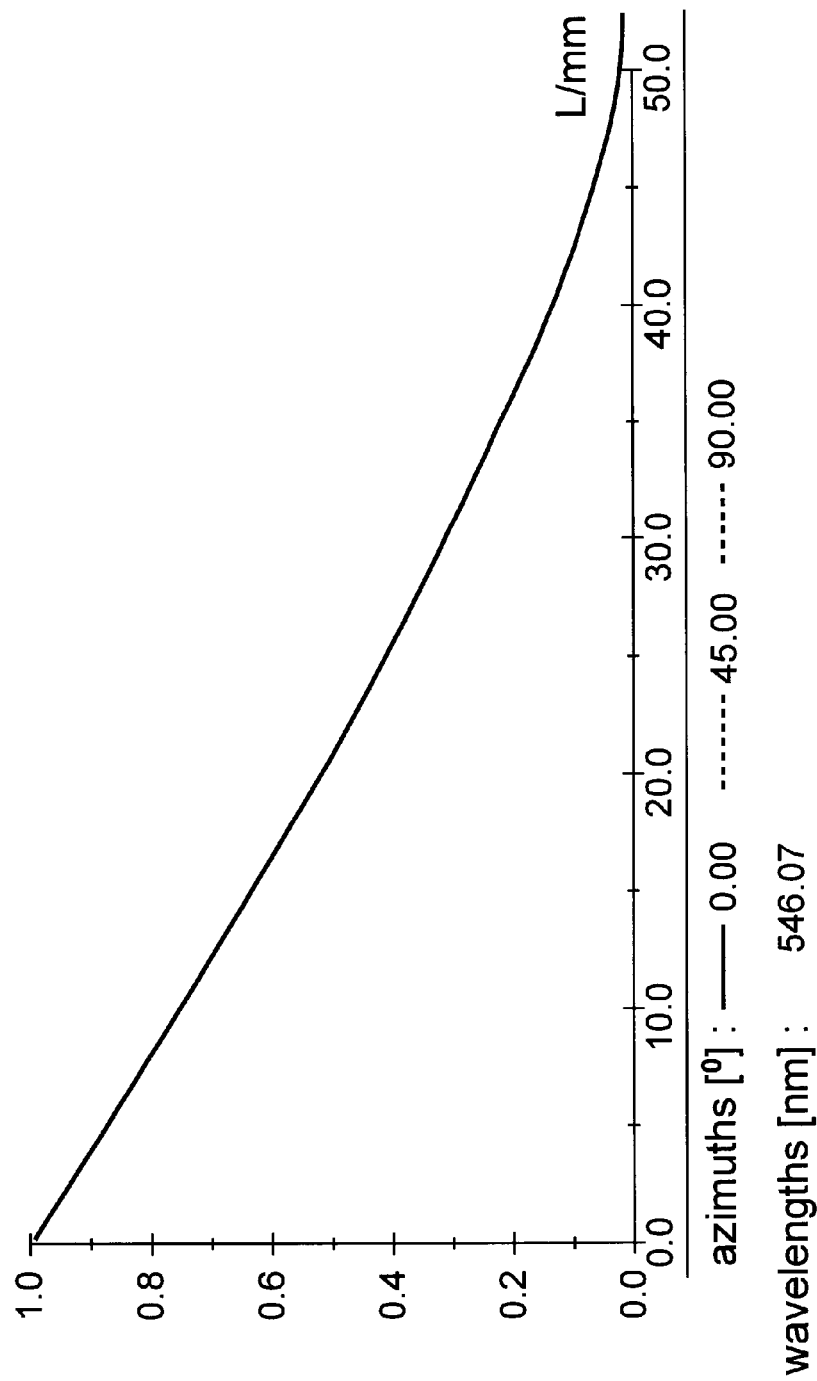
FIG. 3 shows the modulation transfer function.

FIG. 3 shows the modulation transfer function (axial point, wavelength 546 nm). The modulation transfer function (MTF) is an internationally recognized criterion for analyzing and depicting the performance of optical systems. It describes the contrast at which a quantity of pairs of lines is resolved. The quantity of line pairs per mm lies on the abscissa and the contrast from 0 (no contrast) to 1 (full contrast) is indicated in the ordinate. Since the resolution is highly dependent on the aperture, the indicated MTF shows the extremely large opening of the objective according to the invention. The data relate to the axial point in the intermediate image. The number of resolved line pairs is increased by a factor of 100 (linear magnification) in the object space.

While the foregoing description and drawings represent the present invention, it will be obvious to those skilled in the art that various changes may be made therein without departing from the true spirit and scope of the present invention.

What is claimed is:

1. A high-aperture objective comprising:
   in order from the object side a first lens L1 with positive refractive power f1 and a second lens L2 with negative refractive power f2, wherein the focal length ratio between the two lenses is in the range of $-0.4<(f1/f2)<-0.1$ and the total refractive power $1/f1+1/f2$ is greater than zero;
   two positive lenses L3, L4 whose ratio diameter d3, d4 to focal length f3, f4 satisfies the condition greater than 0.3 and less than 0.6: $0.3<d3/f3<0.6$, $0.3<d4/f4<0.6$;
   a negative lens L5; and
   a lens L6;
   wherein the negative lens faces the front group and the focal length ratio of L5 and L6 f5/f6 is between -0.5 and -2: $-0.5<f5/f6<-2$.

2. The objective according to claim 1, with another group comprising three cemented lenses L7, L8, L9 with positive total refractive power and an individual refractive power sequence positive-negative-positive, followed by five additional partially cemented lenses L10, L11, L12, L13, L14 which act predominantly to compensate for field errors.

3. The objective according to claim 2, wherein there is an air gap between L11 and L12 and between L12 and L13.

* * * * *